United States Patent [19]

Kikuchi et al.

[11] Patent Number: 5,403,418
[45] Date of Patent: Apr. 4, 1995

[54] METHOD FOR AUTOMATICALLY ASSEMBLING A BEAD APEX

[75] Inventors: Nobuyuki Kikuchi; Katsuaki Ookochi, both of Shirakawa; Masatsugu Onuki, Fukushima; Kazuaki Yarimizu, Shirakawa, all of Japan

[73] Assignee: Sumitomo Rubber Industries, Ltd., Hyogo, Japan

[21] Appl. No.: 120,333

[22] Filed: Sep. 14, 1993

[30] Foreign Application Priority Data

Sep. 29, 1992 [JP] Japan .................................. 4-260121

[51] Int. Cl.⁶ .............................................. B29D 30/48
[52] U.S. Cl. ...................................... 156/136; 156/422
[58] Field of Search ................. 156/136, 422, 126, 132

[56] References Cited

U.S. PATENT DOCUMENTS

| 2,473,067 | 6/1949 | Miller .................. 156/405.1 |
| 3,895,986 | 7/1975 | Komatsu et al. ............... 156/136 |
| 4,410,389 | 10/1983 | Cole et al. .................. 156/136 |
| 4,933,034 | 6/1990 | Kokubu et al. ............... 156/136 |
| 5,080,738 | 1/1992 | Araki et al. . |

FOREIGN PATENT DOCUMENTS

| 310417 | 4/1989 | European Pat. Off. . |
| 429213 | 5/1991 | European Pat. Off. . |
| 2387116 | 11/1978 | France . |
| 1180515 | 10/1964 | Germany . |
| 51-29551 | 8/1976 | Japan . |
| 58-126139 | 7/1983 | Japan . |
| 61-6782 | 2/1986 | Japan . |
| 62-3935 | 1/1987 | Japan . |
| 62-46634 | 2/1987 | Japan . |
| 2-145328 | 6/1990 | Japan . |

*Primary Examiner*—Michael W. Ball
*Assistant Examiner*—Richard Crispino
*Attorney, Agent, or Firm*—Birch, Stewart, Kolasch & Birch

[57] ABSTRACT

The present invention is intended to prevent the residual stress from remaining in an apex. An apparatus for automatically assembling a bead apex according to the present invention comprises: a means for joining both the longitudinal ends of a strip apex having a triangular section with one short side and two long sides and a specified length to each other, and for forming the strip apex in a cylindrical body such that the long sides become the inner and outer peripheral surfaces; a means for forming the cylindrical body into a disk-like shape such that the short side becomes the inner peripheral surface and the long sides become the axial end surfaces; and a means for joining the inner peripheral surface of the disk-like apex to the outer peripheral surface of a bead ring.

4 Claims, 5 Drawing Sheets

METHOD FOR AUTOMATICALLY ASSEMBLING A BEAD APEX

FIELD OF THE INVENTION AND RELATED ART STATEMENT

The present invention relates to a method of and an apparatus for automatically assembling a bead apex suitable for manufacture of a pneumatic tire for an automobile.

As the prior art relating to the method of and apparatus for automatically assembling a bead apex of this type, there have been known techniques, for example, described in Examined Japanese Patent Publication SHO 51-29551 and SHO 61-6782, and Unexamined Japanese Patent Publication HEI 2-145328.

In the prior art described above, a rubber layer called an apex (filler), which is extruded approximately in an isosceles triangular shape having one short side and two long sides, is annularly stuck around the outer peripheral surface of a bead ring (bead core) in the following manner: namely, the isosceles triangle of the apex is raised, and the bottom side of the isosceles triangle is wound around the outer peripheral surface of the bead ring so as to be press-contacted therewith.

Accordingly, when a strip apex which is cut in a specified length such that both ends are perpendicular to the longitudinal direction is annularly wound around the outer peripheral surface of the bead ring, a V-shaped gap is generated between both the end portions of the apex. In the prior art described above, to eliminate the V-shaped gap, the annular apex wound around the outer periphery of the bead ring is forcibly pulled in the circumferential direction. This causes such a disadvantage that the deformation and the residual stress of the apex become uneven in the circumferential direction.

The circumferential unevenness of the deformation and the residual stress of the apex exerts an adverse effect on a tire main body when the apex is incorporated in a raw rubber and is subjected to vulcanizing formation, thereby causing a disadvantage in deteriorating the tire uniformity.

Further, in the prior art described above, when the apex is wound around the outer periphery of the bead ring, a process for pulling the apex for eliminating the V-shaped gap must be performed while interrupting the winding process. This brings about disadvantages of increasing the number of processes and the operating time, and of making difficult the timing control in each process, resulting in the reduced productivity.

In addition, in the prior art described above, since the end portions of the apex must be clamped for eliminating the V-shaped apex, a clamp unit is required, which complicates the construction of the apparatus, thus causing a disadvantage of increasing the cost of the apparatus.

SUMMARY OF THE INVENTION

Accordingly, an object of the present invention is to uniform the deformation and the residual stress of an apex in the circumferential direction, and to simplify the construction of the apparatus.

The above object can be achieved, according to the present invention, by provision of the following means.

Namely, in a first aspect of the present invention, there is provided a method of automatically assembling a bead apex including: a process of joining both the longitudinal ends of a strip apex having a triangular section with one short side and two long sides and a specified length to each other, and of forming the strip apex in a cylindrical body such that the long sides become the inner and outer peripheral surfaces; a process of forming the cylindrical body into a disk-like shape such that the short side becomes the inner peripheral surface and the long sides become the axial end surfaces; and a process of joining the inner peripheral surface of the disk-like apex to the outer peripheral surface of a bead ring.

Further, in a second aspect of the present invention, there is provided an apparatus for automatically assembling a bead apex including: a means for joining both the longitudinal ends of a strip apex having a triangular section with one short side and two long sides and a specified length to each other, and for forming the strip apex in a cylindrical body such that the long sides become the inner and outer peripheral surfaces; a means for forming the cylindrical body into a disk-like shape such that the short side becomes the inner peripheral surface and the long sides become the axial end surfaces; and a means for joining the inner peripheral surface of the disk-like apex to the outer peripheral surface of a bead ring.

According to the present invention, the strip apex is wound around the cylindrical outer peripheral surface of a cylindrical body formation unit and both the end portions of the strip apex are joined to each other, to thus form the endless cylindrical body. Consequently, both the end portions are perfectly joined, and the V-shaped gap is never generated as in the prior art described above. In the present invention, therefore, there is not required the process of clamping and forcibly pulling the end portions of the apex for eliminating the V-shaped gap as in the prior art.

The cylindrical body is then formed in the disk shape by raising the cylindrical outer peripheral surface radially outwardly by use of the disk formation unit. When the cylindrical body is thus deformed into the disk shape, the deforming force is uniformly applied to the interior of the apex, and accordingly, the uneven residual stress is not generated.

Further, by disposition of the bead ring on the side of the disk formation unit when the cylindrical body is formed into the disk shape, the inner peripheral surface of the strip apex is press-contacted with the outer peripheral surface of the bead ring, so that the apex and the bead ring are integrally joined to each other.

Accordingly, the present invention makes it possible to form the apex into a perfect annular body without a process of clamping and pulling both end portions of the apex for eliminating the V-shaped gap as in the prior art.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The present invention will become more fully understood from the detailed description given hereinbelow and the accompanying drawings which are given by way of illustration only, and thus are not limitative of the present invention, and wherein:

DETAILED DESCRIPTION OF THE PREFERRED EMBODIMENT

Hereinafter, embodiments of the present invention will be described with reference to the accompanying drawings.

Figure 1:
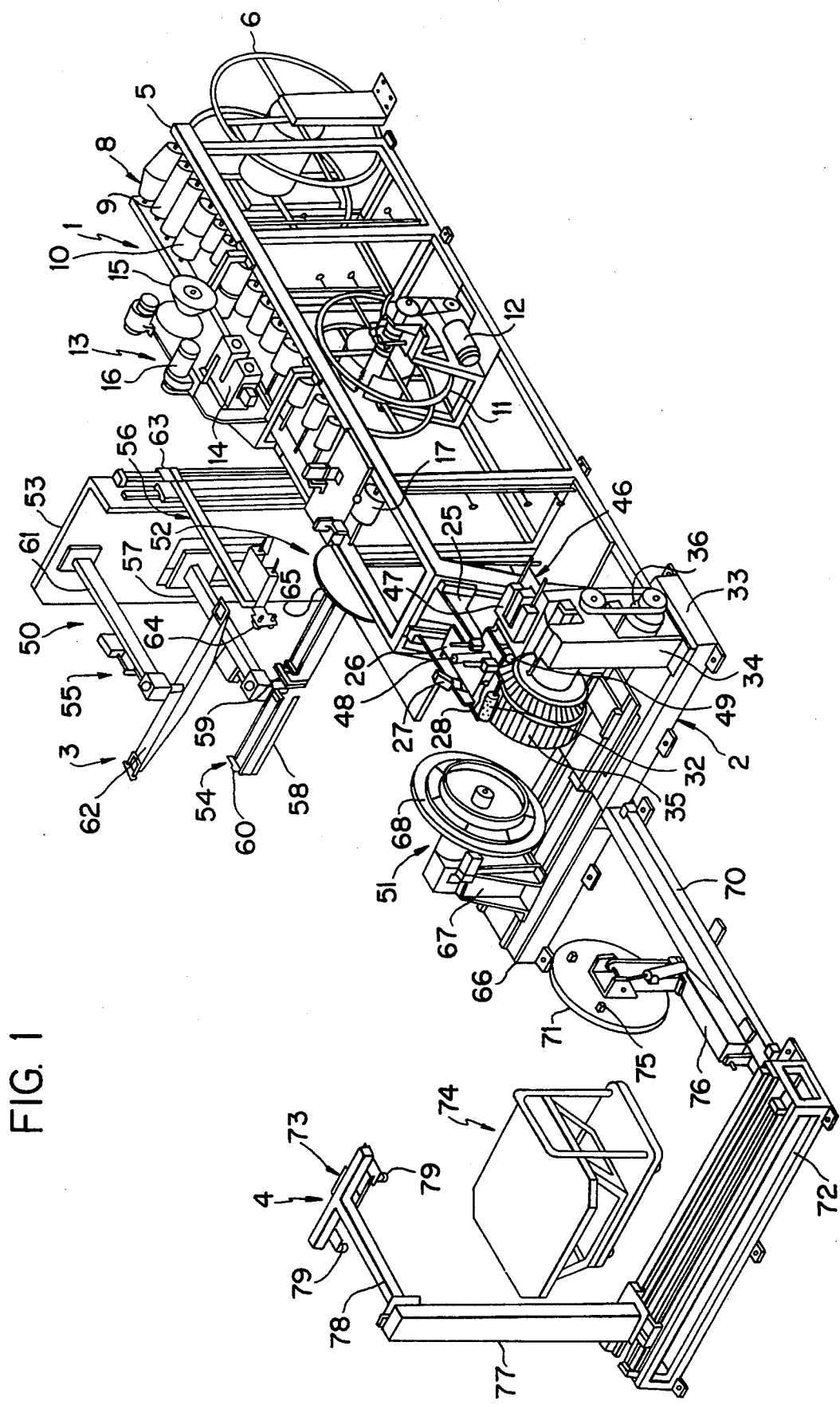
FIG. 1 is a whole perspective view of a bead apex automatically assembling apparatus showing an embodiment of the present invention.

FIG. 1 is a whole construction view of a bead apex automatically assembling apparatus. The bead apex automatically assembling apparatus includes an apex supply apparatus 1 for supplying a strip apex in the longitudinal direction; an annulus formation apparatus 2 for forming the apex in a cylindrical body and then forming it in a disk-like shape; a bead ring supply apparatus 3 for supplying a bead ring on the side of the annulus formation apparatus 2; and a carrying-out apparatus 4 for carrying out a finished product obtained by integrally joining a disk-like apex around the outer periphery of the bead ring.

The apex supply apparatus i has a main body frame 5 fixed on a floor. A reel 6 is removably and turnably provided on one end portion of the main body frame 5. The strip apex is wound around this unwinding reel 6 in a roll shape.

Figure 2:
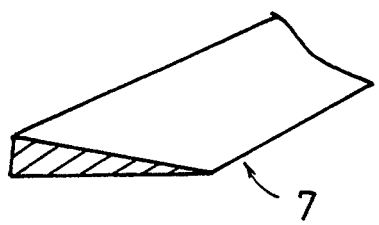
FIG. 2 is a perspective view of a strip apex.

As shown in FIG. 2, the apex 7 is a strip-like body obtained by extruding a rubber material. The sectional shape of the apex 7, being perpendicular to the longitudinal direction, is approximately an isosceles triangle with one short side and two long sides. Namely, the strip apex 7 is formed such that one end portion in the width direction is thick and the thickness is gradually decreased as nearing the other end portion. The strip apex 7 is wound around the unwinding reel 6 in a roll shape such that the long sides of the triangular section become the inner and outer peripheral surfaces. In this embodiment, two strip apexes 7 are symmetrically wound together with a poly liner (not shown).

A roll conveyor unit 8 for conveying the strip apex 7 unwound from the unwinding reel 6 in the longitudinal direction is provided on the upper portion of the main body frame 5 while its conveying surface is set approximately in the horizontal direction. The conveyor unit 8 is constituted of a plurality of conveying rollers 9 juxtaposed in the conveying direction. As for the conveying rollers 9, those provided on the upstream side have such a length that two strip apexes 7 wound around the reel 6 can be simultaneously conveyed, whereas those on the downstream side have such a length that one strip apex 7 can be conveyed.

A cutter 10 is disposed at the boundary between the conveying rollers 9 having such a length as permitting two apexes 7 to be conveyed in parallel to each other and the carrying rollers 9 having such a length as permitting one apex 7 to be conveyed. The cutter 10 is intended to cut the above poly liner at the position between the right and left strip apexes 7.

A reel 11 for winding the strip apex 7 together with one of the liners cut by the cutter 10 is disposed under the roller conveyor unit 8. The winding reel 11 is forcibly driven by a motor 12. The reel 11 is, after winding the apex 7 together with the liner, reversed to be used to supply the next material. A liner winding unit 13, for separating the other liner cut by the cutter 10 from the strip apex 7 and for winding it, is disposed over the roller conveyor unit 8. The liner winding unit 13 is constituted of a pair of pull-rolls 14 for holding and pulling the liner and a reel 15 for winding the liner. One of a pair of the pull-rolls 14 is fixed, and the other is energized by a cylinder drive unit for holding the liner with a specified strength. This pull-roll 14 is forcibly driven by a motor 16.

The strip apex 7 on the conveying rollers 9 is conveyed in the longitudinal direction by the drive force with which the pull roll 14 pulls the liner.

A reforming unit 17 is provided on the downstream side of the roller conveyer unit 8. The reforming unit 17 is intended to prevent the meandering of the strip apex 7.

Namely, since the strip apex 7 is wound around the reel 6, it has a winding curl. When the strip apex 7 is unwound with the winding curl left as it is, the strip apex 7 is usually made in such a state that the side surface on the thicker and short side is projectingly curved. The reforming unit 17 corrects this winding curl and prevents the meandering.

Figure 3:
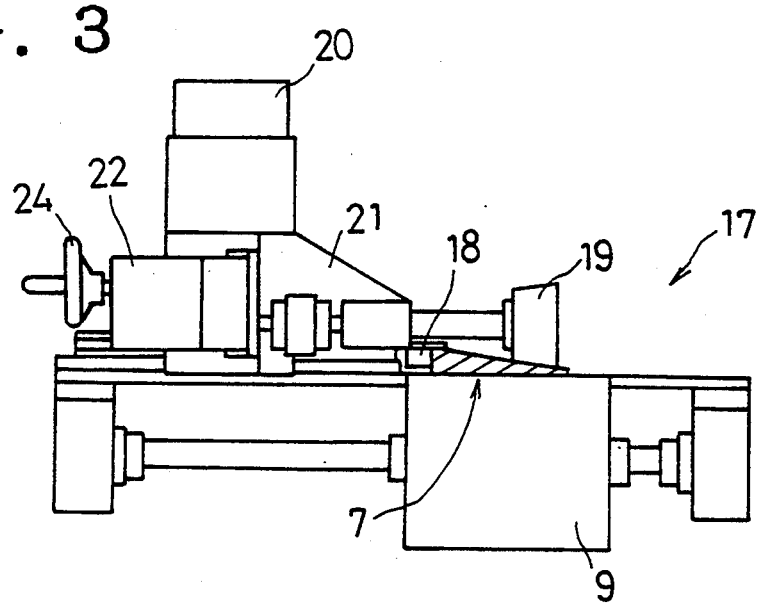
FIG. 3 is a front view of a reforming unit.
Figure 4:
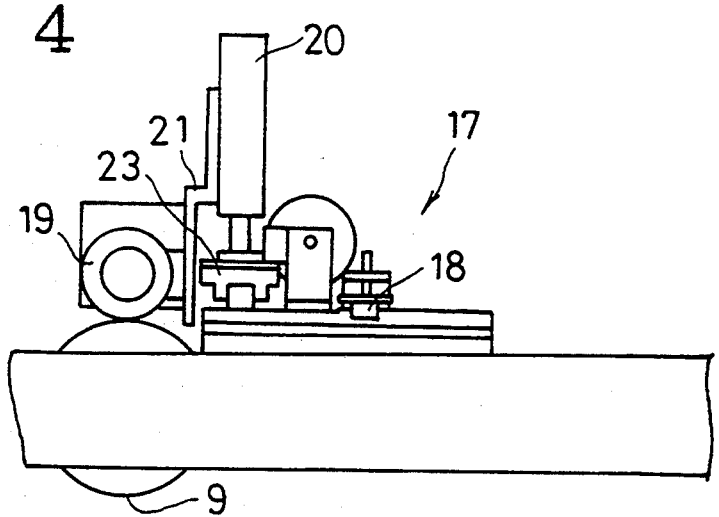
FIG. 4 is a side view of the reforming unit.

The reforming unit 17, as shown in FIGS. 3 and 4, has a guide member 18 foxy guiding the side surface on the short side of the strip apex 7 conveyed along the conveying rollers 9. In this embodiment, the guide member 18 is constituted of a vertical roller rotatable around the vertical axis.

A taper roller 19 is disposed over the conveying rollers 9 at the position slightly apart from the guide member 18 on the downstream side in the Conveying direction. The axis of the taper roller 19 is parallel to that of each conveying roller 9. The peripheral surface of the taper roller 19 is formed in such a taper surface as to be abutted on the upper surface on the thinner side of the strip apex 7 on the conveying rollers 9.

The taper roller 19 is rotatably supported by a liftable bracket 21 vertically moved by a cylinder 20. The taper roller 19 is driven to be rotated at the peripheral speed larger than the conveying speed of the strip apex 7. The cylinder 20 is provided on a slide bracket 23 movable in the lateral direction. The slide bracket 23 is positioned in the lateral direction by a handle 24. Accordingly, by moving the slide bracket 23 in the lateral direction according to the width dimension of the strip apex 7, the taper roller 19 can be changed in its lateral position. By pressing the upper surface of the strip apex 7 on the conveying roller 9 side by the taper roller 19, and further, by rotating the taper roller 19 at a speed larger than the conveying speed, the strip apex 7 is conveyed while the thinner side is bent on the thicker side around the guide member 18, to be thus reformed in the above direction. As a result, the winding curl of the strip apex 7 is corrected and the meandering thereof is prevented. The end portion of the main body frame 5 on the downstream side in the conveying direction is formed in a tilting surface tilted on the downstream side as it goes down from the upper portion, and a liftable frame 25 is vertically movably provided on the tilting surface. A delivery conveyor 26 is provided on the liftable frame 25. The delivery conveyor 26 is constituted of a belt conveyor. The strip apex 7 conveyed from the roller conveyor unit 8 is shifted on the conveying surface of the delivery conveyor 26, and is further conveyed on the downstream side.

A cutting unit 27 is provided on the downstream side from the liftable frame 25. The cutting unit 27 has a one-sided knife for cutting the strip apex 7 throughout the whole length in the width direction so as to be perpendicular to the longitudinal direction and the knife is tilted at a 45° angle in the thickness direction. The knife is movable to cut the strip apex 7 from the thinner side to the thicker side.

In the liftable frame 25, a positioning unit 28 is provided on the downstream side from the cutting unit 27.

Figure 5:
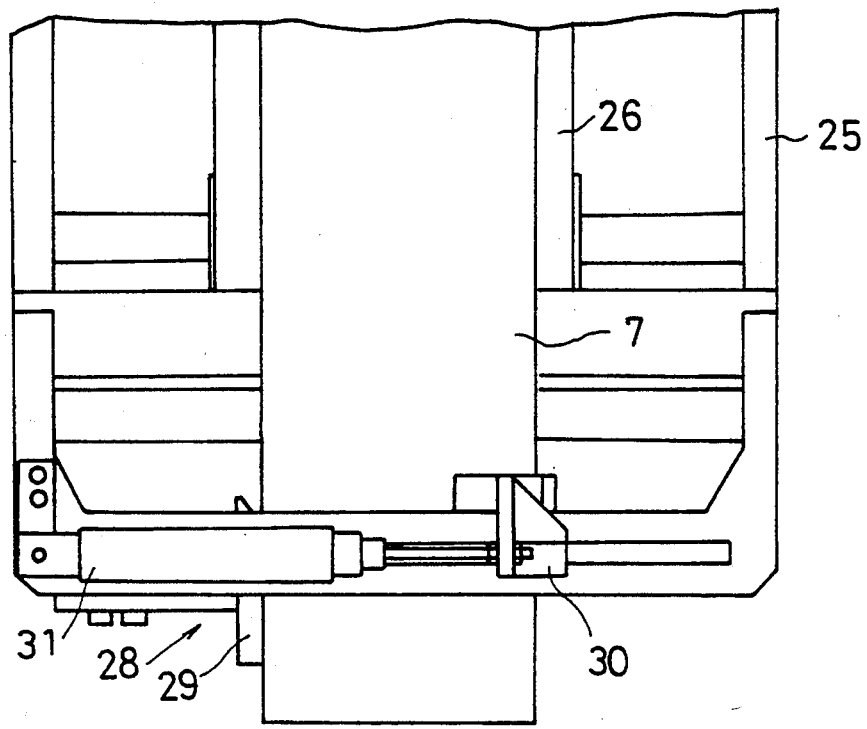
FIG. 5 is a plan view of a positioning unit.
Figure 6:
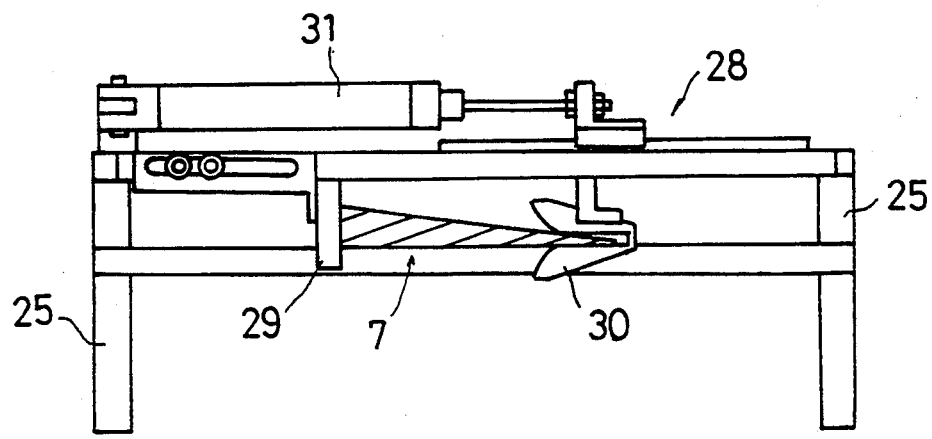
FIG. 6 is a front view of the positioning unit.

The positioning unit 28, as shown in FIGS. 5 and 6, has a positioning guide member 29 fixed on one side portion of the liftable frame 25 in the lateral direction so as to be adjusted in its lateral position. The positioning guide member 29 is provided at such a position as to be slidably contacted with the short side surface of the strip apex 7 conveyed from the delivery conveyor 26. Further, the positioning unit 28 has a V-shape Guide member 30 contacted with two long sides at the edge portion of the strip apex 7 on the thinner side. The V-shape guide member 30 is movable in the lateral direction by a cylinder 31. By pressing the V-shape guide member 30 on the positioning guide member 29 side by the cylinder 31, the strip apex 7 is pressed on the positioning guide member 29, to thus specify the position of the strip apex 7 on the short side. Further, in the liftable frame 25, a disk roller 32 is disposed on the downstream side from the positioning unit 28 so as to be positioned over the strip apex 7 throughout the whole length of the strip apex in the width direction. The disk roller 32 is provided on the liftable frame 25 so as to be movable downward.

The annulus formation apparatus 2 is disposed under the disk roller 32.

The annulus formation apparatus 2 has a first base 33 fixed on the floor, a stand erected on the base 33, and a former 35 turnably supported on the stand 34. The former 35 is driven to be rotated by a motor 36.

The annulus formation apparatus 2 is constituted of a cylindrical body formation unit 2a for forming the strip apex 7 into a cylindrical body and a disk formation unit 2b for forming the cylindrical body into a disk. These cylindrical body formation unit 2a and the disk formation unit 2b are incorporated in the former 35.

Figure 7:
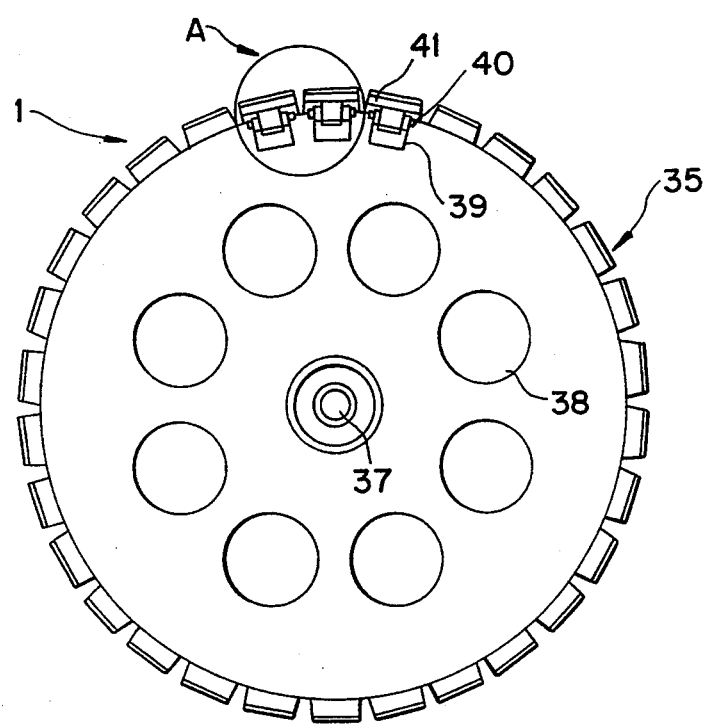
FIG. 7 is a front view of a former of an annulus formation apparatus.
Figure 8:
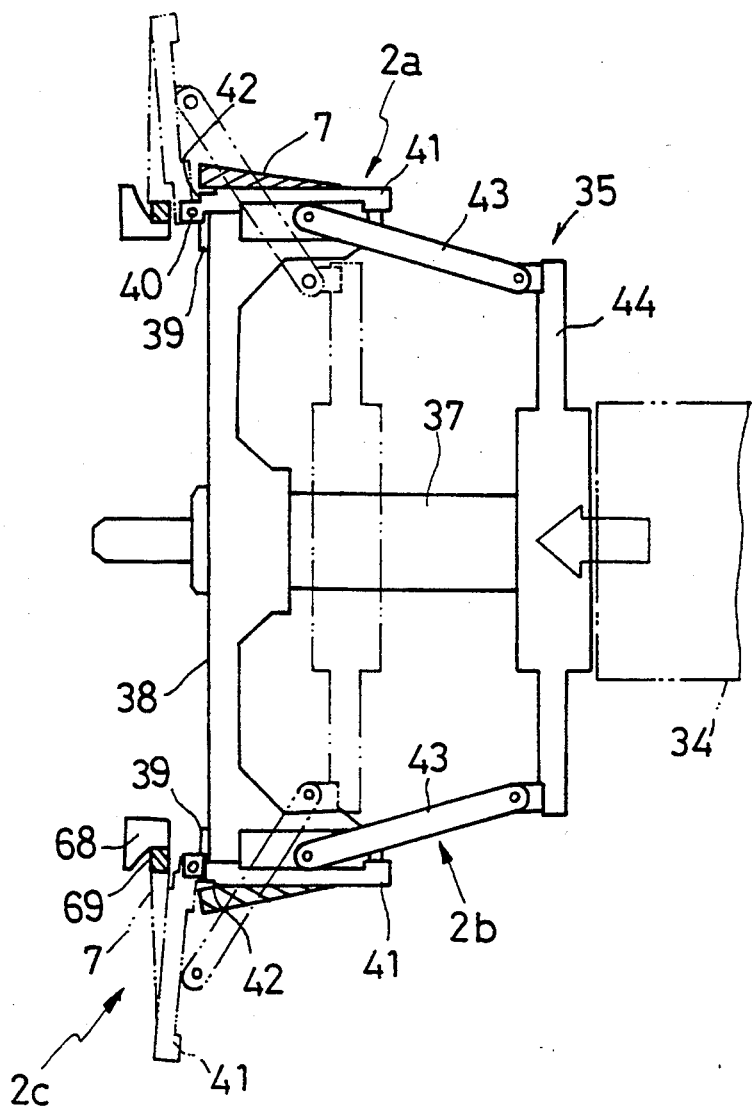
FIG. 8 is a sectional view of the former.

FIGS. 7 and 8 show the details of the former 35.

The former 35 is turnably supported by the stand 34, and has a rotating shaft 37 driven by the motor 36. The rotating shaft 37 has a laterally horizontal axis parallel to the axis of the unwinding reel 6. A wheel 38 is fixed around the rotating shaft 37. A plurality of brackets 39 are disposed along the end surface of the outer peripheral portion of the wheel 38 so as to be circumferentially spaced apart from each other. A segment 41 is turnably disposed on each bracket 39 through a turning shaft 40. The axis of each turning shaft 40 corresponds to the tangential line of the same circle around the rotating axis of the wheel 38.

The segments 41, having the same shape, are disposed so as to be circumferentially spaced apart from each other. The one end portion of each segment 41 is pivotably supported by the turning shaft 40. An escape stepped portion 42 is formed on the outer surface of each segment 41 on the turning shaft side. Each segment 41 can be freely changed in its position between the falling-down posture as shown in the solid line of FIG. 8 and the rising posture as shown in the virtual line of FIG. 8. In the falling-down posture, the outer peripheral surface of each segment 41 forms a cylindrical peripheral surface. On the contrary, in the rising posture, it forms the end surface perpendicular to the rotating axis of the wheel 38.

The cylindrical body formation unit 2a is constituted of the segments 41, the wheel 38 and the like. The disk formation unit 2b is constituted of a mechanism for turning each segment 41 around the turning shaft 40.

For turning each segment 41 around the turning shaft 40, a link 43 is pivotably supported on the inner surface side of each segment 41. The other end of each link 43 is connected to a slider 44 mounted on the rotating shaft 37. The slider 44 is externally fitted around the rotating shaft 37 so as to be slidable in the rotating axial direction and to be rotatable integrally with the rotating shaft 37 by a drive unit (not shown). By moving the slider 44 in the axial direction, each segment 41 can be changed in its position between the falling-down posture and the rising posture through each link 43. Namely, a segment turning unit is constituted of the links 43, slider 44 and the like.

The former 35 is disposed at such a position that the strip apex 7 supplied from the delivery conveyor 26 can be wound around the outer peripheral surfaces of the segments 41 in the falling-down posture. Namely, the former 35 is disposed such that the short side surface of the strip apex 7 laterally positioned by the positioning guide member 29 and supplied from the delivery conveyor 26 is positioned in the vicinity of the turning shafts 40. When the strip apex 7 is wound around the segments 41, the thicker portion of the strip apex 7 faces to the escape stepped portions 42.

Figure 9:
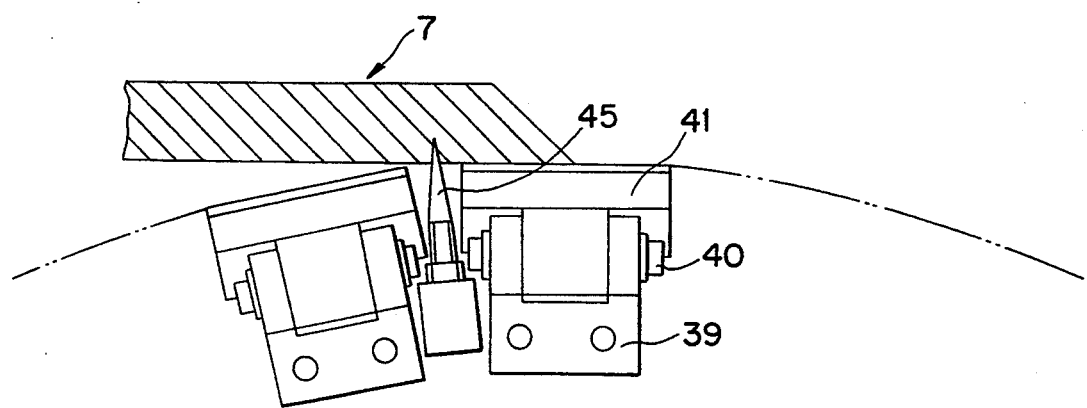
FIG. 9 is an enlarged view of a needle of the former.

As shown in FIG. 9, the former 35 is provided with needles 45 which project from the outer peripheral surfaces of the segments 41 when the segments 41 are in the falling-down posture. A plurality of needles 45 are provided throughout the whole length of the strip apex 7 in the width direction. These needles 45 are provided so as to project between the segments 41 and are provided at one circumferential position of the wheel 38. These needles 45 are intended to be stuck to the end portion of the strip apex 7 supplied from the delivery conveyor 26 for fixing the strip apex 7 on the outer peripheral surface of the former 35.

As shown in FIG. 1, a joint unit 46 is provided on the upper surface of the stand 34 of the annulus formation apparatus 2. The joint unit 46 is intended to pressure-weld the end portions of the strip apex 7 wound around the outer peripheral surface of the former 35 to each other and hence to form an endless annular body.

Namely, the joint unit 46 has a transversely moving unit 47 fixed on the upper surface of the stand 34, a vertically moving unit 48 laterally movable by the transversely moving unit 47, and a joint roller 49 vertically movable by the vertically moving unit 48. By moving the joint roller 49 laterally and vertically (radially of the former), the end portions of the strip apex 7 wound around the outer peripheral surface of the former 35 are pressure-welded to each other radially inwardly of the strip apex 7, so that the end portions of the apex 7 are joined to each other. As shown in FIG. 1, the bead ring supply apparatus 3 is disposed on one lateral side of the apex supply apparatus 1 and the annulus formation apparatus 2.

The bead ring supply apparatus 3 is constituted of a bead ring stock unit 50 for holding a plurality of bead rings, a bead ring clamp unit 51 for holding one bead ring on the side of the annulus formation apparatus 2, and a transfer unit 52 for conveying the bead ring from the stock unit 50 to the clamp unit 51.

The bead ring stock unit 59 has a column 53 fixedly erected on the side of the main body frame 5, a first hanger unit 54 for hanging bead rings on the column 53 together with spacers, a second hanger 55 disposed over the first hanger unit 54 for hanging only the spacer, and a spacer taking out unit 56 for taking out the spacer on the first hanger unit 54 and moving it to the second hanger unit 55.

The bead ring is formed of a metal ring covered with raw rubber. The spacer is interposed between respective bead rings such that the rubber layers of a plurality of the bead rings are prevented from being press-contacted with each other when the bead rings are concentrically overlapped.

The first hanger unit 54 has a first arm 57 vertically movably provided on the column 53 so as to project from the column 53 on the downstream side (in the same as the downstream side of the apex supply apparatus in the conveying direction), and a first hanger 58 provided at the leading edge of the arm 57 so as to project on both sides in the lateral direction. The hanger 58 is provided on the leading edge of the arm 57 so as to be turnable within the horizontal plane. A pair of the right and left pushers 59 moved outwardly from the lateral center portions are provided on the hanger 58. A stopper 60 is fixed on the outer end portion of the hanger 58.

The second hanger unit 55 has a second arm 61 fixed on the column 53, and a second hanger 62 provided at the leading edge of the arm 61 so as to be turnable within the horizontal plane. The second arm 61 and the hanger 62 are disposed in parallel to the first arm 57 and the hanger 58, respectively.

The spacer taking-out unit 56 has a third arm 63 vertically movably provided on the column 53, and an attracting unit 64 laterally movably provided at the leading edge of the arm 63. The attracting unit 64 includes a vacuum pad, and is disposed so as to face to the end portions of the first and second hangers 58 and 62.

A plurality of bead rings through spacers are hung from the first hanger 58. The bead rings and the spacers are pushed outwardly by the pushers 59, and the spacer or bead ring positioned at the outermost end portion is positioned by the stopper 60. In the case that the spacer is positioned at the outermost end portion, the third arm 63 of the spacer taking-out unit 56 is descended, and the attracting unit 64 faces to the spacer. The attracting unit 64 laterally advances, and the vacuum pad is abutted on the spacer for vacuum attraction. After that, the attracting unit 64 is laterally retreated along with the ascending of the third arm 63, being ascended up to the position of the second hanger unit 55, and advances to hang the spacer from the second hanger 62. The attracting unit 64 is returned to the stand-by position.

On the first hanger 58, since the spacer is removed, the bead ring is positioned at the outermost end.

The transfer unit 52 has a disk-like first attracting plate 65, and a magnet for attracting the bead ring is embedded on the end surface of the attracting plate 65. The attracting plate 65 is provided so as to be freely reciprocated between the end portion of the first hanger 58 and the clamp unit 51 and to be laterally movable.

The attracting plate 65 laterally advances from the position of the first hanger 58 and attracts the bead ring hung at the outermost end portion of the first hanger 58. After the first hanger 58 is slightly descended, the attracting plate 65 is retreated, and then moved up to the position of the clamp unit 51.

The clamp unit 51 has a second base 66 provided on the first base 33 of the annulus formation apparatus 2 so as to be laterally adjacent thereto, a tailstock 67 laterally movably provided on the second base 66, and a bead clamper 68 supported by the tail stock 67.

The bead clamper 68 has such a construction that segments annularly disposed are freely extended and contracted in the radial direction. The center of the bead clamper 68 corresponds to that of the former 35 of the annulus formation apparatus 2. The bead clamper 68 is movable up to the side surface position of the wheel 38 of the former 35.

The bead ring, which is held by the attracting plate 65 of the transfer unit 52 and is moved up to the position of the clamp unit 51, is concentrically faced to the bead clamper 68. Thus, as the attracting plate 65 advances, the segments of the bead clamper 68 are positioned on the inner peripheral surface side of the bead ring. Then, the segments are extended in diameter to hold the inner peripheral surface of the bead ring. After that, the attracting plate 65 is returned to the original position and is made in the stand-by condition.

The bead clamper 68 holding the bead ring around the outer peripheral surface is moved in the vicinity of the end surface of the wheel 38 of the former 35 of the annulus formation apparatus 2 by the lateral advance of the tail stock 67 (see FIG. 8).

As shown in FIG. 8, when the segments 41 of the former 35 are raised with respect to the bead ring 69 held by the bead clamper 68, the annular apex 7 wound around the outer peripheral surfaces of the segments 41 is radially raised such that the short side becomes the inner peripheral surface, and the inner peripheral surface of the short side is fixedly fitted around the outer peripheral surface of the bead ring 69. In this fixedly fitting, the escape stepped portions 42 provided on the end portions of the segments 41 generate such a force as pushing the apex 7 toward the center of the former 35.

As is apparent from the above description, a joining unit 2c for integrally joining the bead ring 69 with the apex 7 is constituted of the disk formation unit 2b and the clamp unit 51.

As the apex 7 is press-contacted with the outer periphery of the bead ring 69, the segments 41 of the former 35 are returned into the falling-down state, and the tail stock 67 is retreated. A bead ring 69 with the apex (hereinafter, referred to as the finish bead) held by the bead clamper 68 is carried out by the carrying-out apparatus 4.

As shown in FIG. 1, the carrying-out apparatus 4 has first rails 70 laid to extend on the downstream side from the vicinity of the joining portion between the first and second bases 33 and 66, a second attracting plate 71 movably provided on the first rails 70, second rails 72 laid to be perpendicular to the termination Of the first rails 70, a chuck unit 73 laterally movably provided on the second rails 72, and a bead mounting carrier 74 movable on the floor.

The second attracting plate 71 is formed in a disk-like shape, and has a magnet for attracting the finish bead 69 embedded on the end surface, and a pair of pins 75 engaged with the inner peripheral surface of the finish bead 69. The second attracting plate 71 is provided on a saddle 76 movable on the first rails 70 such that the end surface can be changed in its position between the vertical state and the horizontal state.

The chuck unit 73 has a column 77 laterally movably provided on the second rails 72, a chuck arm 78 vertically movably provided on the column 77, and a pair of chucks 79 provided on the chuck arm 78 so as to be freely close to and apart from each other in the lateral direction.

In the carrying-out apparatus 4, the second attracting plate 71 is moved to the position where it faces to the finish bead 69 held by the bead clamper 68 while the end surface thereof is made in the vertical state, and the segments of the bead clamper 68 are reduced in diameter to release the clamping of the bead clamper 68. Thus, the finish bead 69 is attracted and held by the attracting plate 71. At this time, since the inner surface of the finish bead 69 is held by the pins 75, the finish bead 69 is prevented from being dropped accidentally. Subsequently, the second attracting plate 71 is moved to the second rail 72 side, and the end surface of the attracting plate 71 is tilted in the horizontal state to hold the finish bead 69 thereon.

The column 77 of the chuck unit 73 is then moved to the position of the second attracting plate 71, and the chuck arm 78 is descended, so that a pair of the right and left chucks 79 are positioned in the inner peripheral surface of the finish bead 69. After that, the chuck 79 is opened, to hold the inner peripheral surface of the finish bead 69. The chuck 79 is ascended, moving upwardly of the bead mounting carrier 74, and drops the finish bead 69 on the carrier 74. A spacer is then supplied on the upper surface of the finish bead 69, and the next finish bead 69 will be laminated on the spacer.

According to the bead apex automatically assembling apparatus having the above construction, the strip apex 7 wound around the unwinding reel 6 is conveyed along a roller table unit 8 on the downstream side by pulling of the liner thereof. On the way of the conveying, the winding curl is corrected by the reforming unit 17 to thus prevent the meandering.

When the leading edge of the strip apex 7 reaches the leading edge of the delivery conveyor 26, the leading edge of the apex 7 is cut by the cutting unit 27 so as to be perpendicular to the longitudinal direction and to be tilted at 45° in the thickness direction.

The strip apex 7 is positioned in the width direction by the positioning unit 28, and is supplied to the outer peripheral surface of the former 35 of the annulus formation apparatus 2. At this time, the segments 41 of the former 35 are made in the falling-down posture to form the cylindrical outer peripheral surface. The former 35 is in the stand-by position where the leading edge of the strip apex 7 is stuck by the needles 45 projecting from the outer peripheral surface of the former 35.

The liftable frame 25 is descended, and the leading edge of the strip apex 7 is shifted on the needles 45 of the former 35. Subsequently, the disk roller 32 is descended to press the strip apex 7, so that the needles 45 are firmly stuck through the strip apex 7. The disk roller 32 functions as a final guide to allow the strip apex 7 to certainly follow the edges of the segments 41.

The pressing of the V-shaped member 30 of the positioning unit 28 is released, and the former 35 is started to be rotated. The former 35 is increased in its speed from the low speed, being reduced in the positioning state measured by a sensor (not shown), and is stopped when it reaches the position of the specified length (the strip apex is supplied by the specified length).

The pressing of the V-shaped member 30 of the positioning unit 28 is then performed, and the rear end portion of the strip apex 7 is cut by the cutting unit 27 in the same condition as in the cutting of the above leading edge. After that, the pressing of the V-shaped member 30 of the positioning unit 28 is released, and the former 35 is restarred to be rotated. The rotation of the former 35 is stopped when the front and rear end portions of the strip apex 7 reach the center of the disk roller 32.

The disk roller 32 is ascended and the liftable frame 25 is ascended, and further, the knife of the cutting unit 27 is returned to the original point.

The joint roller 49 advances and is descended, to press the joint portions at the front and rear end portions of the strip apex 7. The joint roller 49 is moved from the thicker side to the thinner side, so that the 45° angle cut end portions of the front and rear end portions of the strip apex 7 are joined to each other. Thus, the strip apex 7 is formed in a cylindrical shape.

At the same time as the above operation, in the bead ring supply apparatus 3, the bead ring 69 is supplied from the bead ring stock unit 50 to the bead ring clamp unit 51 through the transfer unit 52, and is clamped by the bead ring clamp unit 51. Thus, the bead ring 69 is disposed at such a position as shown in FIG. 8.

After that, by the segment turning unit, the segments 41 of the former 35 are raised around the turning shafts 40. By the rising of the segments 41, the apex 7 wound around the outer peripheral surface of the segments 41 is plastically deformed such that the vertex side of the isosceles triangle section is pulled in the circumferential direction, to be deformed in a disk-like shape. The deformation is uniformly performed. Accordingly, the cylindrical apex 7 is formed in a disk-like shape, and the inner surface of the annular apex 7 is fitted around the outer peripheral surface of the bead ring 69, to be joined thereto.

After that, the product obtained by assembly of the apex 7 and the bead ring 69 is carried out by the carrying-out apparatus 4, to be thus placed on the carrier 74.

In addition, the present invention may be carried out in the other forms without departing from the spirit and the essential characteristics of the present invention. The preferred embodiments described in the specification is illustrative and not restrictive. The scope of the present invention is defined by the appended claims, and all changes that fall within the meaning of the claims are intended to be embraced by the present invention.

What we claim is:

1. A method of automatically assembling a bead apex comprising the steps of:
    joining both the longitudinal ends of a strip apex, having substantially a triangular section with one short side and two long sides and a specified length, to each other, and forming said strip apex in a cylindrical body such that said long sides become inner and outer peripheral surfaces;
    during said joining step, sticking needles into the strip apex by use of a disk roller which presses the strip apex onto said needles so as to firmly grip the strip apex;
    forming said cylindrical body into a disk shape such that said short side becomes the inner peripheral surface and said long sides become the axial end surfaces; and joining the inner peripheral surface of said disk shape apex to the outer peripheral surface of a bead ring.

2. The method of automatically assembling a bead apex according to claim 1, which, prior to said cylindrical body formation process, further comprises the steps of:

unwinding said strip apex wound in a roll shape;

conveying said unwound strip apex in the longitudinal direction; and cutting said strip apex in a specified length;

wherein said cutting process comprises the step of cutting said strip apex so as to be perpendicular to the longitudinal direction and to be tilted at a 45° angle relative to one of said long sides.

3. The method of automatically assembling a bead apex according to claim 2, wherein said cylindrical body formation process comprises the step of winding said strip apex around the cylindrical outer peripheral surface of a former including a plurality of segments annularly disposed, such that one of said long sides becomes the inner peripheral surface; and said disk formation process comprises the step of raising said segments radially outwardly, such that said short side becomes the inner peripheral surface.

4. The method of automatically assembling a bead apex according to claim 3, wherein said bead ring joining process includes a process of disposing said bead ring on a side portion of said former so as to be concentric with said former, prior to said disk formation process; and said bead ring joining process comprises the step of externally fitting the inner peripheral surface of said disk apex around the outer peripheral surface of said bead ring disposed on the side of said former by carrying out said disk formation process.

* * * * *